Dec. 8, 1925.

C. R. HERMAN 1,565,146

AUTOMATIC SCALE

Filed May 21, 1924     2 Sheets-Sheet 1

Inventor

Carl R. Herman

By Bryant & Lowry

Attorneys

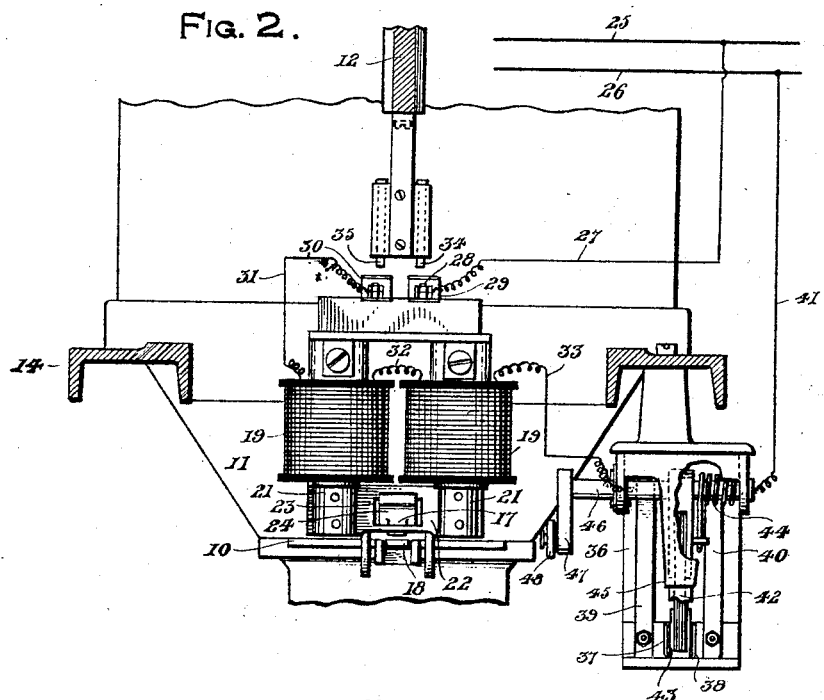

Patented Dec. 8, 1925.

1,565,146

UNITED STATES PATENT OFFICE.

CARL R. HERMAN, OF CRAFTON, PENNSYLVANIA, ASSIGNOR TO JAMES F. COOK, OF CRAFTON, PENNSYLVANIA.

AUTOMATIC SCALE.

Application filed May 21, 1924. Serial No. 714,854.

*To all whom it may concern:*

Be it known that I, CARL R. HERMAN, a citizen of the United States, residing at Crafton, in the county of Allegheny and State of Pennsylvania, have invented certain new and useful Improvements in Automatic Scales; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automatic scales and has for an object to provide a scale having improved means for cutting off the flow of material from a hopper when the requisite amount of material has been deposited in the receptacle provided for the purpose.

A further object of the invention is to provide a scale having an orificed slide under the hopper which latter is intended to be located over a scale platform with means for closing said slide when released, and improved means for holding the slide in open or discharging position and for releasing the slide upon the completion of the introduction of a predetermined amount of material into the receptacle.

A further object of the invention is to provide improved electrical apparatus for controlling the various instrumentalities of an automatic scale for producing and insuring a more nearly instantaneous closing of the orificed slide for discontinuing the flow of material upon the amount of material reaching the predetermined quantity.

With these and other objects in view the invention comprises certain novel parts, units, elements, combinations, arrangements, functions and inter-actions, as disclosed in the drawings, together with mechanical, electrical and functional equivalents thereof, as will be hereinafter more fully described and claimed.

In the drawings:

Figure 2 is a view of the device in end elevation, as indicated by arrow 2 at Figure 1, the scale beam and frame being shown in section;

Figure 4 is a view in inverted plan of the slide, the solenoids and the auxiliary switch;

Figure 5 is a detail view of a modified type of trigger.

Like characters of reference indicate corresponding parts throughout the several views.

Figure 1:
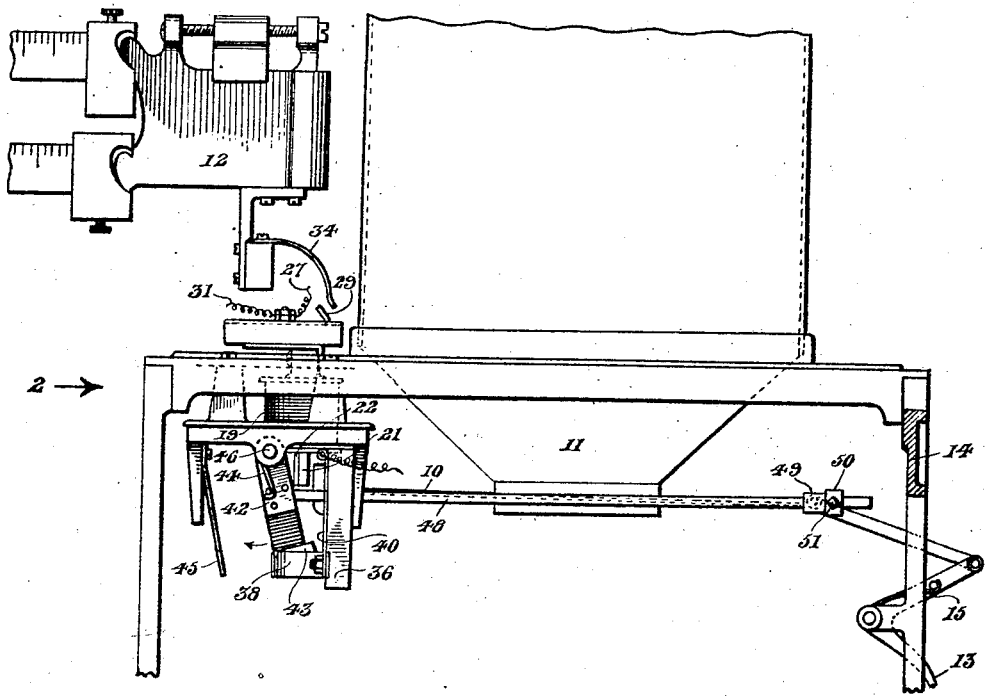
Figure 1 is a view of the improved apparatus in side elevation, certain parts of the scale being conventionally shown associated therewith.

The present invention is adapted to be operated with scales of various types, the essential being a slide 10 operating beneath a hopper 11 to close the discharging orifice of said hopper and an oscillating beam indicated as an entirety at 12.

For actuating the slide 10 a manual lever 13 is located at some convenient point of the frame 14 with a spring 15 (see Fig. 1) for sliding said slide 10 from open to closed position when the said slide is released from tension. In the open position the slide is adapted to permit the discharge of material from the hopper and it is assumed that it will be used in connection with a scale of some type having a receptacle below into which the material will be discharged, but the type of receptacle, whether it be a part of the scale or a bag, a box, a carton, or the like, is immaterial to the present invention. The connections between such scale platform or other supporting member and the swaying beam 12 are too well known in the art to require a complete showing to make an operative structure.

Figure 3:
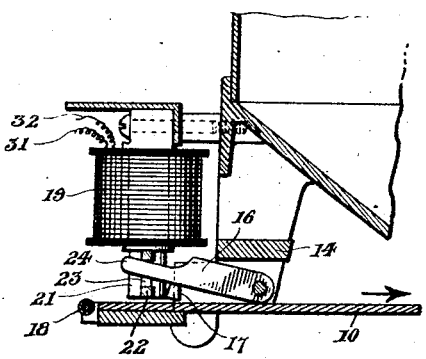
Figure 3 is a view partly in elevation and partly in section showing the slide in closed position and the trigger in releasing position.

As shown at Figure 3 the slide 10 is in its closed position. To move the said slide in the direction indicated by the arrow, the lever 13 will be manipulated, being moved downwardly to the position shown at Figure 1, at which position the slide is in open position. When in open position a trigger 16 falls to engage the end of the slide. For this purpose the type of trigger shown at Figure 3 is provided with a lug 17 which engages over a roller 18 on the extension of the slide, such extension being represented more fully at Figure 4. In this position, being the position shown at Figure 1, the slide is maintained in open position until the trigger 16 is raised to release the slide so that the spring 15 may move such slide to closed position, as shown at Figure 3.

To raise the trigger 16 solenoids 19 are mounted conveniently above the extended end of the slide, as indicated more particularly in Figures 2 and 3. These solenoids are provided with movable cores 21 joined by a bridgepiece 22 having an orifice 23 through which the finger 24 of the trigger 16 extends.

It will be obvious that when the solenoids 19 are properly energized with current of the required polarity, the cores 21 will be lifted lifting therewith the bridge-piece 22 and the trigger 16 to release the slide 10. To provide for energizing the solenoids connection is made with the line wires 25 and 26, one wire 27 leading to a binding post 28 which is electrically connected with the contact 29. A similar contact 30 is spaced and insulated from the contact 28 with a wire 31 leading therefrom to one of the units of the solenoids 19 which is connected by the wire 32 with the other unit from which a wire 33 leads off.

For bridging the interval between the contacts 29 and 30 spring fingers 34 and 35 are carried by the beam 12 and electrically connected so that when said spring fingers shall engage the contacts 29 and 30 the circuit from the line wire 25 will be completed through the solenoid to the switch shown in its entirety as 36. This switch 36 comprises spaced contacts 37 and 38 carried by conductors 39 and 40 respectively. The wire 33 is connected directly with the conductor 39 and a wire 41 leads off from the conductor 40 to the line wire 26 so that when the switch 36 is closed the circuit is closed from the line wire 25 through the solenoids to return to the line wire 26. To close this circuit by the switch 36, a swinging arm 42 is pivoted upon the frame of the switch 36 and provided with a part indicated as 43 to slidably move between the contacts 37 and 38 and close the circuit at that point. The arm 42 is provided with a spring 44 tending to open the switch; that is to say, to swing the arm 42 in the direction indicated by the arrow at Figure 1, a cushioning spring 45 being positioned to receive the impact of said arm as it moves under the stress of said spring 44.

The pivoting of the arm 42 is in the nature of a shaft 46 which extends outwardly through and is journaled in the frame of the switch 36 and upon one end without the lines of said frame is provided with a crank arm 47. The crank arm 47 is pivotally connected with a link 48 which extends along beside the slide 10, as shown in the figures, the slide 10 being provided with a finger 49 slidable upon the link 48 with a stop 50 on said link adjustable in any approved manner, as by the use of the set screw 51.

Instead of providing the trigger 16 with a lug, as indicated at 17, and the slide with a roller, as indicated at 18 in Figure 3, a modified type will provide a trigger 16' with a roller 18' which would engage directly upon the extended end of the slide 10', such modified type being shown at Figure 5 and wholly within the scope of the present invention, the finger 24 being identical with the finger shown at Figure 3 and extending likewise through the orifice of the bridgepiece 22.

In operation, assuming the parts to be disposed in the relation shown at Figure 1, material from the hopper 11 will be discharged through the orifice of the slide 10 registering with the opening in the bottom of the hopper. When the amount of material discharged has reached the predetermined amount, the beam 12 will be swayed in the usual manner. The swaying of the beam will cause the spring fingers 34 and 35 to engage against the contacts 29 and 30 closing the circuit which will energize the solenoids from the line wire 25 through the wire 27, contact 28, through the electrically connected spring fingers 34 and 35 to the contact 30, through the wire 31, the solenoids 19 with their connecting wire 32, the wire 33 to the conductor 39, through the contact 37 and part 43 of the arm and through the contact 38, to the conductor 40 and the wire 41 to line 26. The energizing of the solenoids will cause the cores to lift to the position shown at Figure 3 raising, as will be apparent from that figure, the trigger 16 to release the slide 10. The release of the slide 10 will cause the finger 49 to slide along the link 48 releasing the tension against the stop 50. This will enable the spring 44 to act upon the arm 42 to swing it in the direction indicated by the arrow at Figure 1 to break the connection between contacts 37 and 38, thus opening the circuit while the spring fingers 34 and 35 are still in engagement with the contacts 29 and 30. In other words the closing of the circuit at the contacts 29 and 30 is almost instantly followed by the opening of the circuit at the contacts 37 and 38, whereby the use of the current is even less than momentary.

The scale is now relieved of its actuating weight in any approved manner, as by removing the receptacle from the scale or dumping the contents, or in any other manner in which the mass of weight upon a scale is ordinarily removed. This removal of the weight upon the scale permits the beam 12 to sway back to open the circuit at a second point by removing the spring fingers 34 and 35 from the contacts 29 and 30. This is the normal initial position. From this point the weighing of a commodity is begun in any approved manner, as by first placing a receptacle on the scale. The slide is then manually opened by manipulating the lever 30 so that the slide is moved to the position shown at Figure 1, thereby closing the circuit at the contacts 37 and 38, the circuit still remaining open at the contacts 29 and 30 and continuing open until the weight of the material upon the scale sways the beam, as hereinbefore described.

What I claim is:

1. A cut-off for scales embodying a swaying beam, a sliding plate, a trigger positioned to hold the sliding plate in discharging position, a solenoid having a sliding core connected with the trigger, a source of electrical energy, a circuit including said source of energy and said solenoid, a switch introduced into said circuit and actuated by the sliding of the plate, and a second switch introduced into said circuit and actuated by the swaying of the beam.

2. A cut-off for automatic scales embodying a swaying beam comprising a sliding orificed plate, a pivoted trigger positioned to engage the end of the plate and hold the plate in discharging position, a solenoid having a sliding core connected with and to actuate the trigger when energized, a source of electrical energy, a circuit including said source of energy and said solenoid, a switch introduced into said circuit, means connecting the switch and sliding plate to close the switch when the plate is in discharging position and open the switch when the plate is in closed position, a second switch introduced into said circuit, and means carried by the swaying beam for closing said last-mentioned switch when the beam is swayed from the predetermined quantity of material discharged through said plate.

In testimony whereof I hereunto affix my signature.

CARL R. HERMAN.